United States Patent
Agne et al.

(10) Patent No.: US 11,658,549 B2
(45) Date of Patent: May 23, 2023

(54) TRIGGER LOCKOUT WITH DISSIMILAR ACTIONS

(71) Applicant: Globe (Jiangsu) Co., Ltd., Changzhou (CN)

(72) Inventors: Ola Agne, Taberg (SE); Eric Lennings, Huskvarna (SE); Thomas Arnell, Huskvarna (SE)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 488 days.

(21) Appl. No.: 16/651,262

(22) PCT Filed: Sep. 27, 2017

(86) PCT No.: PCT/CN2017/103729
§ 371 (c)(1),
(2) Date: Mar. 26, 2020

(87) PCT Pub. No.: WO2019/061084
PCT Pub. Date: Apr. 4, 2019

(65) Prior Publication Data
US 2020/0266690 A1 Aug. 20, 2020

(51) Int. Cl.
*H02K 11/28* (2016.01)
*A01G 20/47* (2018.01)
(Continued)

(52) U.S. Cl.
CPC ........... *H02K 11/28* (2016.01); *A01D 34/006* (2013.01); *A01D 34/84* (2013.01); *A01G 3/053* (2013.01);
(Continued)

(58) Field of Classification Search
CPC ...... A01D 34/006; A01D 34/84; A01G 20/47; A01G 3/053; A01G 3/086; B25F 5/00;
(Continued)

(56) References Cited

U.S. PATENT DOCUMENTS 2,760,611 A * 8/1956 Jaeschke ............. H02P 29/0027
310/95
4,155,418 A 5/1979 Tremblay et al.
(Continued)

FOREIGN PATENT DOCUMENTS

WO WO-2017078809 A1 * 5/2017 ............. B64D 31/06

OTHER PUBLICATIONS

WO-2017078809-A1, Bruce, May 2017, All (Year: 2017).*
European Search Report and Written Opinion in related European Patent Application No. 17927427.9 dated Sep. 18, 2020; 7 pages.
Video—infoboard.de: "Test: Braun MultiQuick 9 Stabmixer", Nov. 28, 2016 (Nov. 28, 2016), p. 1, XP054980857, Retrieved from the Internet: URL:https://www.youtube.com/watch?v=vulAUSFYcp8 [retrieved on Sep. 2, 2020].
(Continued)

*Primary Examiner* — Naishadh N Desai
(74) *Attorney, Agent, or Firm* — Rooney IP, LLC

(57) ABSTRACT

A control assembly for selectively controlling actuation of an electric motor arranged to power a hand-held power tool based on combined performance of two dissimilar operator actions and a hand-held power tool including such a control assembly. A switch member may be closed responsive to an enabling action including a first of the two dissimilar operator actions. A throttle control member becomes operable responsive to actuation of the throttle control member past a first movement threshold, i.e. a second dissimilar operator action, while the switch member is in the actuated state. The throttle control member remains repeatedly operable above a second movement threshold, even if the switch member is opened. Actuation of the throttle control member to below the second movement threshold will render the throttle control member non-operable until renewed combined performance of the first and second dissimilar operator actions.

12 Claims, 3 Drawing Sheets

(51) Int. Cl.
   *A01D 34/00*   (2006.01)
   *A01D 34/84*   (2006.01)
   *A01G 3/053*   (2006.01)
   *A01G 3/08*    (2006.01)
   *B25F 5/02*    (2006.01)
   *H02K 7/14*    (2006.01)
   *B27B 17/02*   (2006.01)
   *B27B 17/08*   (2006.01)

(52) U.S. Cl.
   CPC .............. *A01G 3/086* (2013.01); *A01G 20/47* (2018.02); *B25F 5/02* (2013.01); *H02K 7/145* (2013.01); *B27B 17/02* (2013.01); *B27B 17/08* (2013.01); *H02K 2213/06* (2013.01)

(58) Field of Classification Search
   CPC ........... B25F 5/02; B27B 17/02; B27B 17/08; H02K 11/28; H02K 2213/06; H02K 7/145; H02P 1/14; H02P 7/03; H02P 7/063; H02P 1/18
   See application file for complete search history.

(56) References Cited

U.S. PATENT DOCUMENTS

| | | | |
|---|---|---|---|
| 2008/0105243 A1* | 5/2008 | Monks | F41B 11/71 124/31 |
| 2014/0158391 A1* | 6/2014 | Xin | B25F 5/02 173/170 |
| 2014/0174772 A1* | 6/2014 | Mandalka | B23Q 11/0089 173/1 |
| 2015/0280532 A1 | 10/2015 | Mizutani et al. | |
| 2016/0268068 A1* | 9/2016 | Chiasson | B25F 5/00 |
| 2017/0051873 A1* | 2/2017 | Martinsson | F16P 3/00 |
| 2018/0138839 A1* | 5/2018 | Puzio | H02K 11/28 |

OTHER PUBLICATIONS

Search Report and Written Opinion in related International Patent Application No. PCT/CN2017/103729 dated Jun. 27, 2018; 10 pages.

\* cited by examiner

TRIGGER LOCKOUT WITH DISSIMILAR ACTIONS

TECHNICAL FIELD

The present invention relates generally to a control assembly for selectively controlling actuation of an electric motor arranged to power a working assembly of a hand-held power tool and a hand-held power tool comprising such a control assembly.

BACKGROUND ART

Hand-held power tools are often used to perform tasks that inherently require such hand-held power tools to be mobile. Emissions, such as e.g. noise and/or pollutants, generated by such hand-held power tools often make electric motors a preferred choice to power such tools.

However, due to the near instantaneous response time and immediate high torque provided by electric motors upon being actuated, e.g. via a throttling mechanism or trigger, it will normally be prudent to provide some kind of safety mechanism or interlock to ensure that inadvertent actuation of the working assembly is inhibited.

Thus, prior art hand-held power tools are sometimes provided with a throttle lockout mechanism. Such a throttle lockout mechanism is often provided on a handle portion of the hand-held power tool and must be actuated, e.g. pressed or pushed, in order to allow the throttling mechanism or trigger to be actuated.

However, an operator may sometimes be able to grasp the handle portion compressing both the throttle lockout mechanism and the throttling mechanism or trigger essentially at the same time, thereby inadvertently powering the working assembly. Thus, addressing this issue is desirable.

Alternatively, some prior art hand-held power tools are provided with a trigger interlock operator, such as a side-button, that may be moved between a guard position where it resists pressure to move the trigger and at least one armed position, in which position it allows the trigger to be pressed. This type of interlock operators are commonly arranged to return to the guard position each time the trigger is released making the tool cumbersome and unpleasant to operate. Thus, addressing this issue is also desirable.

SUMMARY OF INVENTION

An object of the present invention is to improve the safety and operability of hand-held power tools.

This is provided by a control assembly for selectively controlling actuation of an electric motor arranged to power a working assembly of a hand-held power tool, the control assembly being configured to provide the selective control based on combined performance of two dissimilar operator actions, the control assembly comprising: an electronic control unit; and a switch member configured to be operable to an actuated state responsive to an enabling action comprising a first of the two dissimilar operator actions; and a throttle control member configured to become operable responsive to actuation of the throttle control member past a first movement threshold while the switch member is in the actuated state, and wherein actuation of the throttle control member past the first movement threshold comprises a second of the two dissimilar operator actions, and wherein the throttle control member is configured to remain repeatedly operable responsive to actuation of the throttle control member above a second movement threshold located below the first movement threshold, even if the switch member is brought to a non-actuated state, and wherein actuation of the throttle control member to below the second movement threshold is configured to render the throttle control member non-operable until renewed combined performance of the first and second dissimilar operator actions.

In a further embodiment the throttle control member is configured to become operable responsive to actuation of the throttle control member to within a span past the first movement threshold and below a third movement threshold while the switch member is in the actuated state.

In a yet further embodiment the throttle control member is operable to be actuated between an unactuated position located below the second movement threshold and a maximum movement position located above the first movement threshold.

In a still further embodiment the throttle control member is biased towards the unactuated position.

In yet another embodiment the throttle control member is arranged to operate a potentiometer upon actuation thereof.

In an additional embodiment the throttle control member is arranged to provide haptic operator feedback by differentiated resistance to movement above and below the first movement threshold.

In still another embodiment the electronic control unit is arranged to control the operation of the electric motor starting at zero revolutions per minute responsive to actuation of the throttle control member past the first movement threshold while the switch member is in the actuated state and up to a maximum available revolutions per minute responsive to actuation of the throttle control member towards the maximum movement position.

In a further additional embodiment the first, second and/or third movement thresholds are defined by potentiometer output values corresponding to predefined amounts of actuation of the throttle control member.

In another embodiment the span past the first movement threshold and below the third movement threshold is defined by the corresponding potentiometer output values.

In one particular embodiment the span past the first movement threshold and below the third movement threshold is between 5 and 15 percent of a 100 percent potentiometer value corresponding to the maximum movement position.

In another alternative embodiment the span past the first movement threshold and below the third movement threshold is between 8 and 13 percent of a 100 percent potentiometer value corresponding to the maximum movement position.

According to a further embodiment is also envisaged a hand-held power tool comprising a control assembly according to any one of the above embodiments.

Furthermore, here envisaged is an embodiment where a hand-held power, as above, is at least one of: a chainsaw; a trimmer; an edger; a mower; a blower or the like.

The above embodiments have the beneficial effects that: safety and operability of hand-held power tools is improved; a throttle member of hand-held power tools may be repeatedly cycled, without requiring the operator to undertake potentially cumbersome renewed combined performance of first and second dissimilar operator actions; a limited number of mechanical components are required reducing the risk of mechanical failures; cost of the control assembly can be contained whilst ensuring safe and reliable operation.

BRIEF DESCRIPTION OF DRAWINGS

The invention is now described, by way of example, with reference to the accompanying drawings, in which.

DESCRIPTION OF EMBODIMENTS

Figure 1:
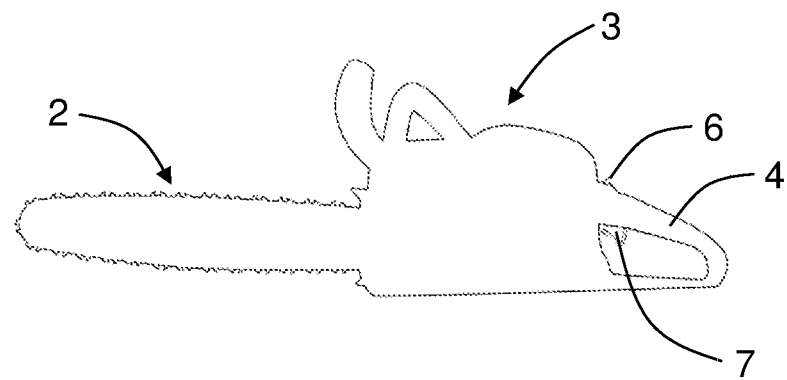
FIG. 1 illustrates schematically a side view of a chainsaw as an example of a hand-held power tool according to an example embodiment.

In the following will be described some example embodiments for a control assembly 1 for selectively controlling actuation of an electric motor, not shown, arranged to power a working assembly 2 of a hand-held power tool 3, such as e.g. a chainsaw, as illustrated schematically in FIG. 1. It should be appreciated that the chainsaw is merely one example of a hand-held power tool 3 that includes a working assembly 2, such as the chain and guide bar of the chainsaw, which working assembly 2 may require or benefit from employing one of the example control assembly 1 embodiments described in the following. Thus, the following example embodiments could also be practiced in connection with other types of hand-held power tools 3 that may include working assemblies 2 of various kind.

The control assembly 1, which is configured to provide the selective control based on combined performance of two dissimilar operator actions, will be described more fully with reference to the accompanying drawings, in which some, but not all example embodiments are shown. Like reference numerals refer to like elements throughout.

The requirement for combined performance of two dissimilar operator actions in order to actuate the electric motor is provided for in order to ensure that an operator is exhibiting positive control of the hand-held power tool 3.

The hand-held power tool 3 may include an electric power source, such as e.g. a battery, or a corded connection to a mains power outlet (not shown), for supplying the electric motor to power the working assembly 2.

Figure 2:
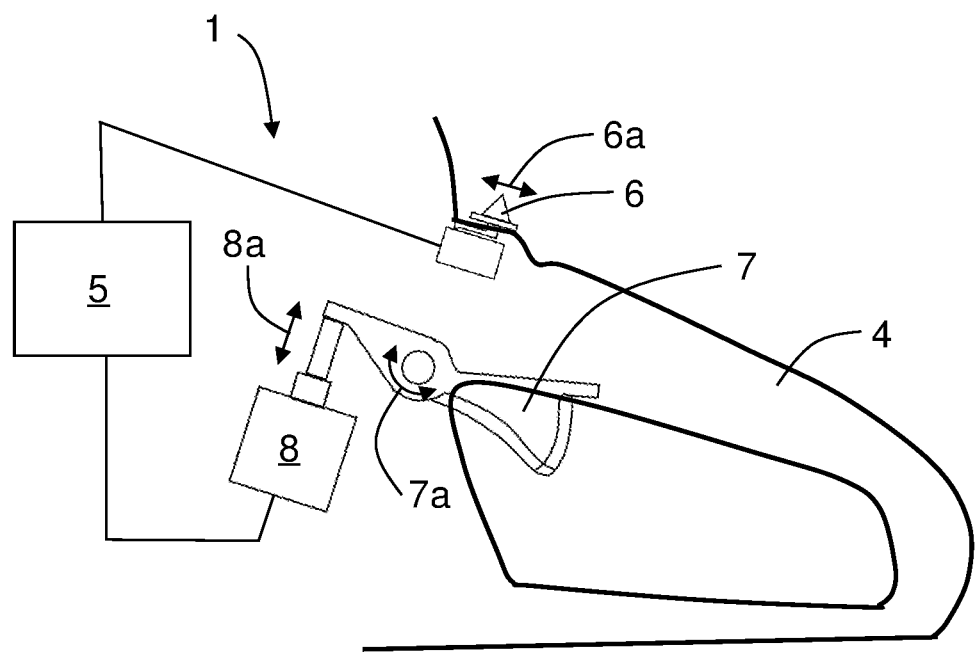
FIG. 2 illustrates schematically a partially cutaway side view of rear handle of a chainsaw comprising a control assembly according to an example embodiment.

Illustrated schematically in FIG. 2 is a partially cutaway side view of rear handle 4 of a chainsaw 3 comprising such a control assembly 1. The control assembly 1 comprises an electronic control unit 5 and a switch member 6 configured to be operable, e.g. in the direction of arrow 6a, to an actuated state responsive to an enabling action comprising a first of the two dissimilar operator actions.

In a first example embodiment, a throttle control member 7 of the control assembly is also arranged at the rear handle 4 and configured to become operable responsive to actuation of the throttle control member 7, e.g. around a pivot according to arrow 7a, past a first movement threshold REF_LATCH while the switch member 6 is in the actuated state. Actuation of the throttle control member 7 past the first movement threshold REF_LATCH comprises a second of the two dissimilar operator actions.

The throttle control member 7 may be embodied as a trigger, lever, button or other such member that is configured to cause the electric motor to turn at a selective rotational speed when actuated. The term "throttle control member", as used herein, should be understood to represent any actuator that is capable of being operated by a hand or finger of an operator.

The throttle control member 7 is configured to remain repeatedly operable responsive to actuation of the throttle control member 7 above a second movement threshold REF_RELEASE located below the first movement threshold REF_LATCH, even if the switch member 6 is brought to a non-actuated state. Hereby is ensured that the throttle 7 may be repeatedly cycled, without requiring the operator to undertake potentially cumbersome renewed combined performance of the first and second dissimilar operator actions.

Actuation of the throttle control member 7 to below the second movement threshold REF_RELEASE is configured to render the throttle control member 7 non-operable until renewed combined performance of the first and second dissimilar operator actions.

In another example embodiment, in addition to what is described for the first embodiment above, the throttle control member 7 is configured to become operable responsive to actuation of the throttle control member 7 to within a span past the first movement threshold REF_LATCH and below a third movement threshold REF_MAX while the switch member 6 is in the actuated state.

In a further example embodiment, in addition to what is described for the embodiments above, the throttle control member 7 is operable to be actuated between an unactuated position, i.e. in which the throttle control member 7 protrudes fully from the rear handle 4, located below the second movement threshold REF_RELEASE and a maximum movement position, i.e. in which the throttle control member 7 is pressed fully towards the rear handle 4, located above the first movement threshold REF_LATCH. The throttle control member 7 is suitably biased towards the unactuated position, such that it will return to the unactuated position when released. Such biasing is suitably performed using a return spring (not shown) in a manner well known to the skilled person. Thus, such a return spring will ensure that the throttle control member 7 is brought to below the second movement threshold REF_RELEASE such that the throttle control member 7 is rendered non-operable until renewed combined performance of the first and second dissimilar operator actions.

In some cases, the physical position of the throttle control member 7 may be allowed to be changed whether or not the first dissimilar operator action is performed. Alternatively, the physical position of the throttle control member 7 may be inhibited to change from the unactuated position until the first dissimilar operator action is performed.

In still further example embodiments the electronic control unit 5 is arranged to control the operation of the electric motor starting at zero revolutions per minute responsive to actuation of the throttle control member 7 past the first movement threshold REF_LATCH while the switch member 6 is in the actuated state and up to a maximum available revolutions per minute responsive to actuation of the throttle control member 7 towards the maximum movement position.

In some further example embodiments, in addition to what is described for the embodiments above, the throttle control member 7 is arranged to provide haptic operator feedback by differentiated resistance to movement above and below the first movement threshold REF_LATCH.

In still further example embodiments, in addition to what is described for the embodiments above, the throttle control member 7 is arranged to operate a potentiometer 8 upon actuation thereof. In such embodiments, the first REF_LATCH, second REF_RELEASE and/or third REF_MAX movement thresholds are suitably defined by potentiometer 8 output values corresponding to predefined amounts of actuation of the throttle control member 7. For embodiments where the throttle control member 7 is configured to become operable responsive to actuation of the throttle control member 7 to within a span, the span past the first movement threshold REF_LATCH and below the third movement threshold REF_MAX is suitably defined by the corresponding potentiometer 8 output values, e.g. voltage values.

In some such example embodiments where the throttle control member 7 is configured to become operable responsive to actuation of the throttle control member 7 to within a span, in addition to what is described for the embodiments above, the span past the first movement threshold REF_LATCH and below the third movement threshold REF_MAX is between 5 and 15 percent of a 100 percent potentiometer 8 value corresponding to the maximum movement position.

In yet other such example embodiments where the throttle control member 7 is configured to become operable responsive to actuation of the throttle control member 7 to within a span, in addition to what is described for the embodiments above, the span past the first movement threshold REF_LATCH and below the third movement threshold REF_MAX is between 8 and 13 percent of a 100 percent potentiometer value corresponding to the maximum movement position.

Further herein is also envisaged a hand-held power tool 3 comprising a control assembly 1 according to any one of the example embodiments described in the foregoing. In such embodiments, the hand-held power tool 3 is suitably at least one of: a chainsaw; a trimmer; an edger; a mower; a blower or the like.

Figure 3A:
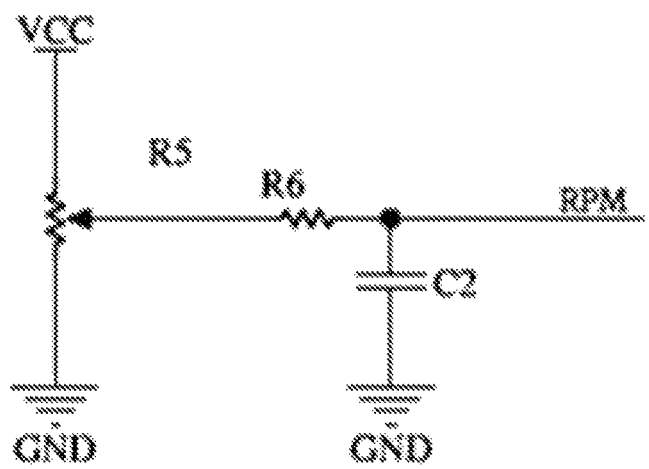
FIGS. 3a-c illustrates schematically an example of a control assembly logic of a control assembly according to an example embodiment.
Figure 3B:
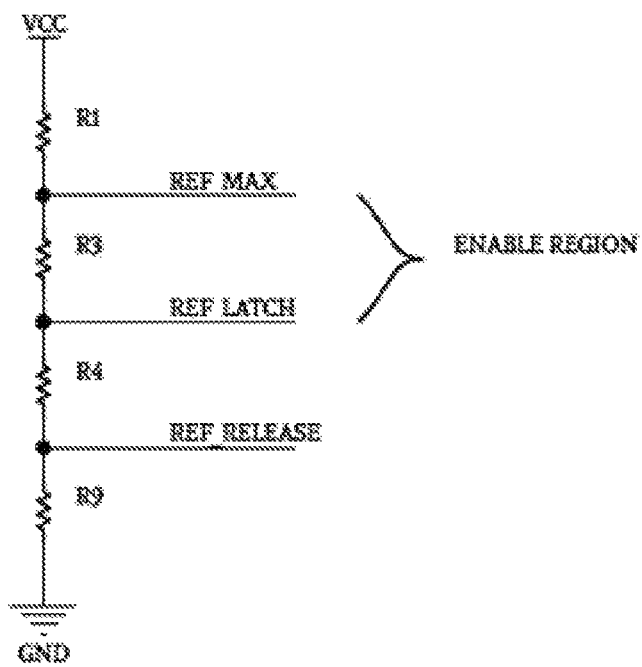
Figure 3C:
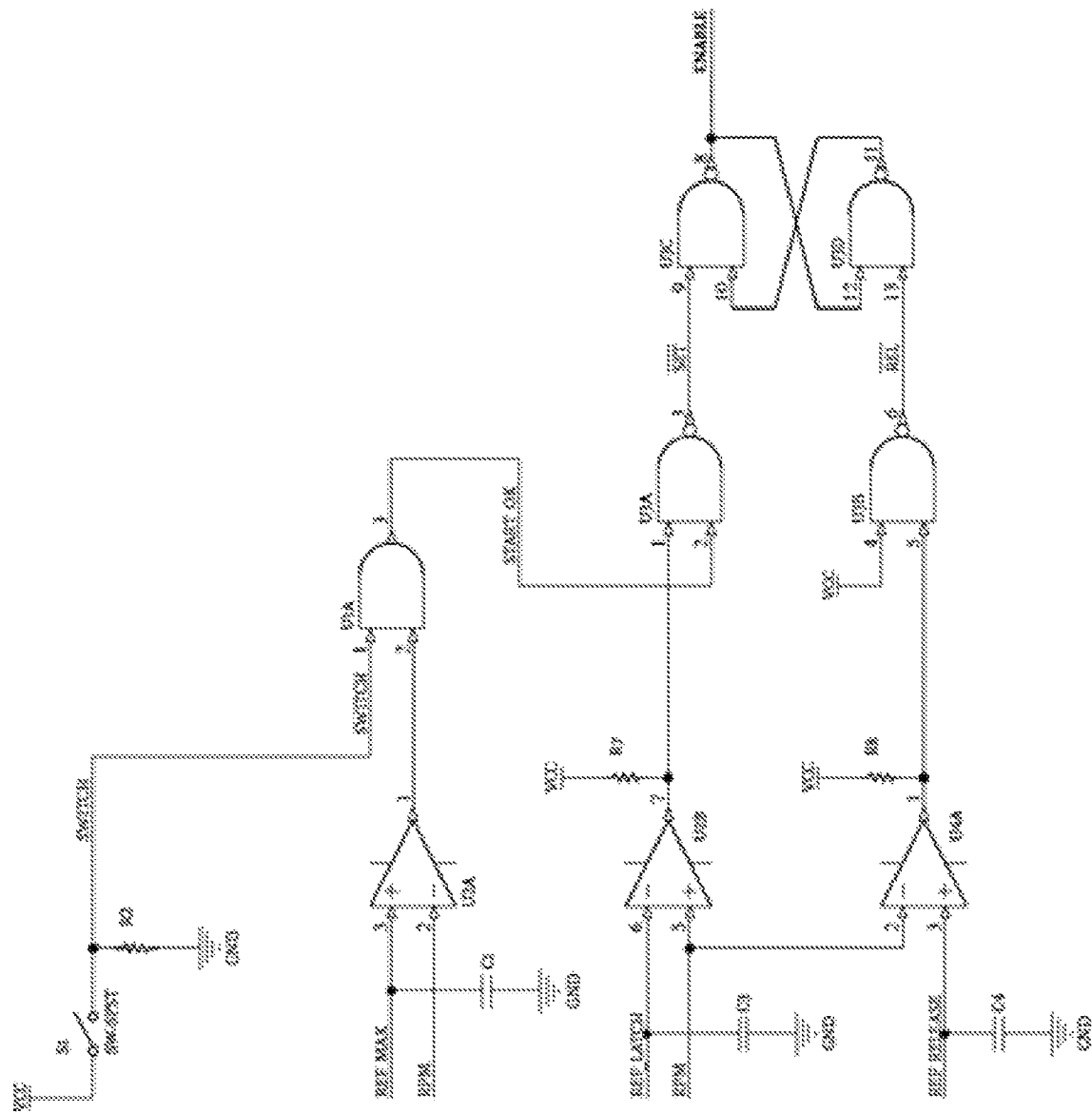

A schematic example of a control assembly logic of a control assembly according to an example embodiment is illustrated in FIGS. 3*a-c*. No component values are given in the figures as these may to be selected to suit the specific implementation chosen.

In FIG. 3*a* is schematically illustrated a setup of a potentiometer 8 arranged to be operated by throttle control member 7 upon actuation thereof to output a voltage RPM for selecting a desired revolutions per minute operation by the electric motor. Such a potentiometer 8 may be linear and arranged to move in the direction of arrow 8*a* under the influence of a pivoted throttle control member 7, as illustrated in FIG. 2, or alternatively rotational and arranged to rotate with the throttle control member 7 in the direction of arrow 7*a* of FIG. 2.

FIG. 3*b* illustrates schematically a setup for generating selective predetermined reference voltages corresponding to desired potentiometer output voltages at the first REF_LATCH, second REF_RELEASE and third REF_MAX movement thresholds. The ENABLE region, i.e. the span past the first movement threshold REF_LATCH and below the third movement threshold REF_MAX, is decided by the dividers formed by the resistors R1, R3, R4 and R9.

FIG. 3*c* illustrates schematically a setup for generating an ENABLE signal responsive to performance of the two dissimilar operator actions. The RPM potentiometer 8 output voltage of FIG. 3*a* must be between the voltages REF_LATCH and REF_MAX, i.e. within the span past the first movement threshold REF_LATCH and below the third movement threshold REF_MAX, in order for the ENABLE output to be latched ON. The two comparators U2A and U2B work to SET the ENABLE output, but ONLY if REF_LATCH<RPM<REF_MAX and the SWITCH 6 signal is high. Then, and only then, will the ENABLE output be turned on. The ENABLE output is turned off only when RPM<REF_RELEASE, i.e. when the potentiometer 8 output voltage RPM falls below the second movement threshold REF_RELEASE.

Considering U2A and U1A, if the potentiometer 8 output voltage RPM<REF_MAX and the SWITCH 6 is closed than START_OK, and further considering U2B and U3A, if the potentiometer 8 output voltage RPM>REF_LATCH and START_OK then SET→ENABLE=On. Conversely, considering U4A and U3B, if the potentiometer 8 output voltage RPM<REF_RELEASE then REL→ENABLE=Off. U3B acts as an inverter only. U3C and U3D constitutes an ENABLE latch, the truth table of which is as follows.

| SET | REL | ACTION |
|---|---|---|
| 0 | 0 | Not allowed |
| 0 | 1 | ENABLE = 1 |
| 1 | 0 | ENABLE = 0 |
| 1 | 1 | No change |

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A control assembly for selectively controlling actuation of an electric motor arranged to power a working assembly of a hand-held power tool, the control assembly being configured to provide the selective control based on combined performance of two dissimilar operator actions, the control assembly comprising:
   an electronic control unit configured to control operation of the electric motor;
   a switch member, functionally coupled to the electronic control unit and configured to be operable to an actuated state responsive to an enabling action comprising a first of the two dissimilar operator actions; and
   a throttle control member, functionally coupled to the electronic control unit, biased towards an unactuated position, and configured to become operable responsive to actuation of the throttle control member past a first movement threshold while the switch member is in the actuated state, wherein actuation of the throttle control member past the first movement threshold comprises a second of the two dissimilar operator actions, the throttle control member is arranged to provide haptic operator feedback by differentiated resistance to movement above and below the first movement threshold, the throttle control member is configured to remain repeatedly operable responsive to actuation of the throttle control member above a second movement threshold located below the first movement threshold, even if the switch member is brought to a non-actuated state, actuation of the throttle control member below the second movement threshold to renders the throttle control member non-operable until renewed combined performance of the first and second dissimilar operator actions; and releasing the throttle control member returns the throttle control member to the unactuated position rendering the throttle control member non-operable until renewed combined performance of the first and second dissimilar operator actions.

2. A control assembly according to claim 1, wherein the throttle control member is configured to become operable responsive to actuation of the throttle control member to within a span past the first movement threshold and below a third movement threshold while the switch member is in the actuated state.

3. A control assembly according to claim 1, wherein the throttle control member is operable to be actuated between an unactuated position located below the second movement threshold and a maximum movement position located above the first movement threshold.

4. A control assembly according to claim 3, wherein the throttle control member is biased towards the unactuated position.

5. A control assembly according to any claim 1, wherein the throttle control member is arranged to operate a potentiometer upon actuation thereof.

6. A control assembly according to claim 3, wherein the electronic control unit is arranged to control the operation of the electric motor starting at zero revolutions per minute responsive to actuation of the throttle control member past the first movement threshold while the switch member is in the actuated state and up to a maximum available revolutions per minute responsive to actuation of the throttle control member towards the maximum movement position.

7. A control assembly according to claim 5, wherein the first, second and/or third movement thresholds are defined by potentiometer output values corresponding to predefined amounts of actuation of the throttle control member.

8. A control assembly according to claim 7, wherein the span past the first movement threshold and below the third movement threshold is defined by the corresponding potentiometer output values.

9. A control assembly according to claim 8, wherein the span past the first movement threshold and below the third movement threshold is between 5 and 15 percent of a 100 percent potentiometer value corresponding to the maximum movement position.

10. A control assembly according to claim 8, wherein the span past the first movement threshold and below the third movement threshold is between 8 and 13 percent of a 100 percent potentiometer value corresponding to the maximum movement position.

11. A hand-held power tool comprising a control assembly according to claim 1.

12. A hand-held power tool according to claim 11, wherein the hand-held power tool is at least one of: a chainsaw; a trimmer; an edger; a mower; a blower or the like.

* * * * *